Patented June 30, 1953

2,644,008

UNITED STATES PATENT OFFICE 2,644,008

PREVENTION OF DECOMPOSITION OF CHLOROALKYL ARYLOXYALKYL SULFITES

Harry D. Glenn, Naugatuck, Conn., and Ludwig Meuser, Baton Rouge, La., assignors to United States Rubber Company, New York, N. Y., a corporation of New Jersey No Drawing. Application April 4, 1951, Serial No. 219,319

6 Claims. (Cl. 260—456)

This invention relates to the prevention of the decomposition of chloroalkyl aryloxyalkyl sulfites.

Di-esters of sulfurous acid wherein one of the esterifying groups is a chloroalkyl radical containing 2 to 4 carbon atoms and 1 to 3 chlorine atoms and having no chlorine atom attached to the alpha carbon atom, and the other esterifying group is a radical of the formula R—O—X—, wherein R is selected from the class consisting of monovalent aryl hydrocarbon radicals and such radicals substituted by at least one member of the group consisting of alkyl, alkoxy, cycloalkyl, halo and nitro, and X is an alkylene radical having 2 to 4 carbon atoms, are known insecticides, particularly for the control of mites; see U. S. patent to Harris, Tate and Zukel 2,529,494. These chloroalkyl aryloxyalkyl sulfites sometimes tend to decompose, especially under severe storage conditions, liberating sulfur dioxide and darkening in color.

The object of the present invention is to prevent such decomposition of these chloroalkyl aryloxyalkyl sulfites.

In carrying out the present invention, there is mixed with such chloroalkyl aryloxyalkyl sulfites an alkylene oxide, e. g. propylene oxide or ethylene oxide. A small amount of such alkylene oxide, e. g. up to 5% by weight of the sulfite ester, is sufficient to prevent decomposition of the chloroalkyl aryloxyalkyl sulfite for extended periods of time.

As an illustration of the present invention, various amounts of propylene oxide were mixed with portions of 2 - (p - tert.-butylphenoxy)isopropyl 2-chloroethyl sulfite which were then subjected to an accelerated aging or storage test by being placed in sealed clear glass bottles in direct sunlight on a roof. In a control sample without the addition of propylene oxide, decomposition of the 2 - (p - tert. - butylphenoxy)isopropyl 2-chloroethyl sulfite was evidenced by the release of sulfur dioxide, as shown by the odor and the darkening of the chemical in a few days. With 0.1% of propylene oxide (based on the sulfite), the sulfur dioxide odor and darkening of the chemical did not develop for about six weeks. With 0.25% of propylene oxide (based on the sulfite), the decomposition was not noticeable even after five months. With 0.5% and 1% of propylene oxide (based on the sulfite), the decomposition was not noticeable even after eight months. With 5% of propylene oxide (based on the sulfite), no decomposition has yet been observed. If desired, of course, large amounts of the alkylene oxide than necessary to prevent decomposition may be admixed with the chloroalkyl aryloxyalkyl sulfite, the excess alkylene oxide acting as a diluent. For example, compositions containing a major proportion by weight of 2-(p - tert. - butylphenoxy)isopropyl 2-chloroethyl sulfite and minor proportions, i. e. up to 5% and more by weight of the composition, of propylene oxide have been used as insecticides with no decomposition in storage, the propylene oxide in excess of the small amount necessary to prevent decomposition of the sulfite ester acting as a diluent or carrier. The propylene oxide and the sulfite ester are mutually soluble liquids. The propylene oxide evaporates when the chloroalkyl aryloxyalkyl sulfite is sprayed and thereby imparts no residue problem or dilutes the efficiency of the sulfite. With ethylene oxide, which is a gas at room temperatures, the ethylene oxide may be introduced into the sulfite ester and absorbed therein in the form of a gas, or the ethylene oxide may be mixed in liquid form under pressure with the sulfite ester. Other chloroalkyl aryloxyalkyl sulfites within the general formula above referred that may be similarly stabilized with alkylene oxides are set forth in U. S. Patent 2,529,494, to which reference is made, more particularly to the examples of such sulfite esters set forth from column 2, line 41, to column 6, line 18, of said patent.

Having thus described our invention, what we claim and desire to protect by Letters Patent is:

1. A di-ester of sulfurous acid wherein one of the esterifying groups is a chloroalkyl radical containing 2 to 4 carbon atoms and 1 to 3 chlorine atoms and having no chlorine atom attached to the alpha carbon atom, and wherein the other esterifying group is a radical of the formula R—O—X—, wherein R is selected from the class consisting of monovalent aryl hydrocarbon radicals and such radicals substituted by at least one member of the group consisting of alkyl, alkoxy, cycloalkyl, halo and nitro, and X is an alkylene radical having 2 to 4 carbon atoms, said sulfite ester having admixed therewith 0.1 to 5% of its weight of an alkylene oxide.

2. A di-ester of sulfurous acid wherein one of the esterifying groups is a radical of the formula R—O—X—, wherein R is selected from the class consisting of monovalent aryl hydrocarbon radicals and such radicals substituted by at least one member of the group consisting of alkyl, alkoxy, cycloalkyl, halo and nitro, and X is an alkylene radical having 2 to 4 carbon atoms, and wherein the other esterifying group is a monochloroalkyl radical containing 2 to 4 carbon atoms in which at least one hydrogen atom is attached to the alpha carbon atom and in which the chlorine atom is attached to a carbon atom other than the alpha carbon atom, said sulfite ester having admixed therewith 0.1 to 5% of its weight of an alkylene oxide.

3. 2-(p - tert.-butylphenoxyl) isopropyl 2-chloroethyl sulfite admixed with 0.1 to 5% of its weight of an alkylene oxide.

4. A composition as defined in claim 1 in which the alkylene oxide is propylene oxide.

5. A composition as defined in claim 2 in which the alkylene oxide is propylene oxide.

6. 2-(p-tert.-butylphenoxy) isopropyl 2-chloroethyl sulfite admixed with 0.1 to 5% of its weight of propylene oxide.

HARRY D. GLENN.
LUDWIG MEUSER.

References Cited in the file of this patent

UNITED STATES PATENTS

| Number | Name | Date |
|---|---|---|
| 1,944,274 | Salzberg | Jan. 23, 1934 |
| 2,529,494 | Harris | Nov. 14, 1950 |